United States Patent
Bunce

[11] Patent Number: 5,809,217
[45] Date of Patent: Sep. 15, 1998

[54] METHOD AND APPARATUS FOR DERIVING ADDITIONAL GRAY LEVELS IN A MULTI-GRAY LEVEL HALFTONE IMAGE

[75] Inventor: Richard W. Bunce, Boise, Id.

[73] Assignee: Hewlett-Packard Company, Palo Alto, Calif.

[21] Appl. No.: 782,900

[22] Filed: Jan. 10, 1997

[51] Int. Cl.$^6$ ................................................. H04N 1/405
[52] U.S. Cl. ........................ 395/109; 382/237; 358/457; 358/298
[58] Field of Search .......................... 395/109; 382/237, 382/270; 358/456, 457, 460, 466, 534, 535, 536, 298

[56] References Cited

U.S. PATENT DOCUMENTS

| | | | |
|---|---|---|---|
| 4,032,977 | 6/1977 | Liao | 358/455 |
| 5,267,054 | 11/1993 | Chang et al. | 358/456 |
| 5,321,525 | 6/1994 | Hains | 358/456 |
| 5,542,029 | 7/1996 | Karlsson | 395/109 |

OTHER PUBLICATIONS

"HP Color Recovery Technology", A.C. Barkens, Hewlett–Packard Journal, vol. 46, No. 2 pp. 51–59(1995).

*Primary Examiner*—Scott Rogers

[57] ABSTRACT

A laser printer/copier performs a method which converts a gray pixel value of N possible levels, to a halftone image exhibiting n apparent pixel gray values (where N>n). Each pixel of the halftone image is rendered by a laser at one of n−1 non-white gray levels through use of the method. The method includes the steps of: sequentially, logically, tiling a dither matrix across the image and determining a relational value between a gray value of each image pixel and a logically superimposed dither matrix value. At each odd tile position, a determination is made for each such relational value, which of n−1 threshold values is exceeded and if an intermediate one of the n−1 threshold values is exceeded, the pixel is assigned a first gray modulation value. At each even tile position, a determination is made, for each such relational value, of which of the n−1 threshold values is exceeded and if the aforesaid intermediate threshold value is exceeded, the pixel is assigned a second, different one of the n−1 gray level modulation values. Thereafter, laser modulation values are examined for pixels that are correspondingly positioned at three sequential (odd/even/odd or even/odd/even) dither matrix tile positions. The gray modulation value assigned to the middle corresponding pixel is then adjusted in accordance with gray modulation values assigned to the adjoining corresponding pixels so as to provide a smoothing of gray value transitions. The smoothed gray level values are then applied to control a laser print engine.

12 Claims, 3 Drawing Sheets

METHOD AND APPARATUS FOR DERIVING ADDITIONAL GRAY LEVELS IN A MULTI-GRAY LEVEL HALFTONE IMAGE

FIELD OF THE INVENTION

This invention relates to a method and apparatus for providing halftone images through use of pixels evidencing plural gray levels and, more particularly, to a method for producing such a multi-level halftone image while employing minimal memory.

BACKGROUND OF THE INVENTION

Both color and gray value images are composed of picture elements (pixels), each pixel represented by multiple bits which define either a color or a gray level. In order to represent such images on a bi-level (black and white) printer, the pixel data, if not already gray level, is converted into a gray level, multi-bit configuration (e.g. 8 bits per pixel). The individual gray level pixels are then converted to binary level pixels through use of a scaling and dithering process. The dithering process provides a halftone like texture to selected area of the image so as to provide gray value variations therein.

The dithering process employs a comparison of the individual pixel values against a threshold matrix to control the conversion of the gray level values to appropriate patterns of bi-level data. When 8 bits are employed, 256 gray levels can be represented by the digital values. The threshold matrix comprises a plurality of row-arranged gray level values which control the conversion of the gray level pixel values to bi-level pixel values. In essence, each entry in the threshold matrix is a threshold gray level value which, if exceeded by the image gray level pixel value, causes that gray level image pixel to be converted to a black pixel. If, by contrast, the image gray level pixel value is less than or equal to the corresponding threshold matrix gray level value, it is converted to a "white" pixel.

During the dithering process (i.e., halftoning), the threshold matrix is tiled across the image pixels to enable each gray level image pixel to be compared against the correspondingly, logically-positioned gray level value of the threshold matrix.

While the above discussion has concerned, mainly, the application of dithering to bi-level printer and copier mechanisms, devices have now become available which are capable of providing "n" levels of gray (including "white") at each pixel site, where n is greater than 2. Hereafter, it is to be understood that when the term "gray" is used, it applies to both color and black/white images and, when applied to a color image, relates to the intensity of the color on a scale of 0 to N-1, where N is greatest value obtainable from the number of bits used to represent the color.

Clearly, if a laser imaging system is able to produce all N levels of a color, then there is no need to halftone an image as all "gray" levels are fully represented in the rendering. However, there is a countervailing cost requirement to reduce print buffer size. Thus, the amount of data used to represent a pixel is often limited to just two or three bits per pixel per color plane. When it is realized that in a color printer, there are three and often four color planes required for each image, the reduction in the number of bits per pixel results in a substantial savings in required buffer size. Naturally, this results in the limiting of the number of gray levels that can be represented for each pixel.

Thus, where a byte is used to represent each color in an image received from a host processor, the use by the laser-printer/copier of 2 or 3 bits per pixel color plane dictates that only 4 to 8 levels of modulation are available from the laser device to represent all 256 possible gray levels. Dithering actions are thus still required to provide acceptable image gray level representations. Nevertheless, it is known that the more apparent gray levels that are provided in the resulting image, the better the perceived quality of image reproduction.

The prior art contains a number of teachings regarding the obtaining of added gray levels for an image. U.S. Pat. No. 4,032,977 to Liao describes a technique that attempts to recover gray level information that is lost due to coarse pixel quantizations of the original gray level image. The gray level of a pixel and its immediate neighbors are examined and predetermined probabalistic information is used to estimate a modified gray level for the pixel. The technique synthesizes additional gray levels from an image that does not contain the additional gray level information content. Rather, it recognizes predetermined errors and estimates an intended gray level which, through coarse quantization, may have caused the error.

U.S. Pat. No. 5,321,525 to Hains describes a technique for carrying an error term forward during clustered dot halftoning. The error term indicates the difference between the intended image gray level and the current halftone gray level and is used to modify subsequent clustered dot generation. The resulting halftone image has more apparent gray values and greater information content, but an undesirable halftone variation (i.e., noise) is introduced by the error diffusion process.

In an article entitled "HP Color Recovery Technology", A. C. Barkens, Hewlett-Packard Journal, Vol. 46, No. 2, pp 51–59 (1995), a technique is described for countering the noise which results from a color dither process. The technique averages all of the pixels in a dither area to counter the dither noise, but the resulting low-pass filter effect can produce edge blurring. Edge recognition is used to turn off the averaging at the edges to avoid the blurring effect.

It is an object of this invention to provide a dither/halftone procedure for a multi-gray level printer/copier which enables the printer/copier to output an image having an increased number of apparent of gray values while retaining a minimal print buffer size.

It is another object of this invention to provide an improved method for halftoning a gray level image, where the print engine capability for providing gray level pixels is substantially limited.

It is yet another object of this invention to provide an improved method for halftoning a gray level image, wherein the image exhibits smoothed gray level transitions.

SUMMARY OF THE INVENTION

A laser printer/copier performs a method which converts a gray pixel value of N possible levels, to a halftone image exhibiting n apparent pixel gray values (where N>n). Each pixel of the halftone image is rendered by a laser at one of n-1 non-white gray levels through use of the method. The method includes the steps of: sequentially, logically, tiling a dither matrix across the image and determining a relational value between a gray value of each image pixel and a logically superimposed dither matrix value. At each odd tile position, a determination is made for each such relational value, which of n-1 threshold values is exceeded and if an intermediate one of the n-1 threshold values is exceeded, the pixel is assigned a first gray modulation value. At each even tile position, a determination is made, for each such relational value, of which of the n−1 threshold values is exceeded and if the aforesaid intermediate threshold value is exceeded, the pixel is assigned a second, different one of the n−1 gray level modulation values. Thereafter, laser modulation values are examined for pixels that are correspondingly positioned at three sequential (odd/even/odd or even/odd/even) dither matrix tile positions. The gray modulation value assigned to the middle corresponding pixel is then adjusted in accordance with gray modulation values assigned to the adjoining corresponding pixels so as to provide a smoothing of gray value transitions. The smoothed gray level values are then applied to control a laser print engine.

DETAILED DESCRIPTION OF THE INVENTION

Figure 1:
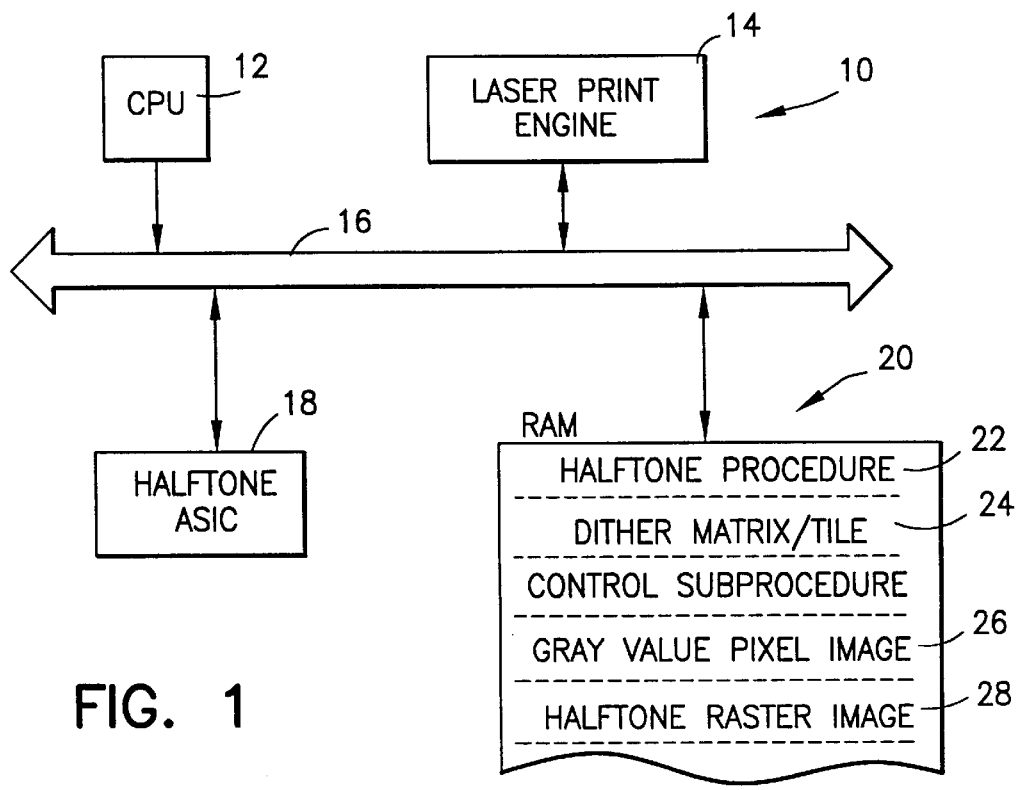
FIG. 1 is a block diagram of a laser print engine incorporating the invention hereof.

FIG. 1 is a block diagram of a laser printer that incorporates the invention hereof. It is to be understood that while a laser printer will be hereafter described, that the invention is equally applicable to any device which utilizes multiple gray level pixels to render a halftone image. More specifically, such devices include laser printers, copiers, facsimile devices, plotters, inkjet based devices, etc..

Laser printer 10 comprises a central processing unit (CPU) 12 and a laser print engine 14, interconnected via a bus 16. A halftone application-specific integrated circuit (ASIC) 18 is interconnected to bus 16 and provides the hardware functionality needed to perform high-speed halftoning of a received multi-level gray image. A random access memory (RAM) 20 includes procedures and data necessary to enable CPU 12 to carry out the halftoning functions of the invention. More specifically, RAM 20 includes a halftone procedure 22, a dither matrix and tile control subprocedure 24, and a gray value pixel image 26 (as received from a host processor, not shown) which is to be altered by the invention into a halftone raster image 28, suitable for rendering by laser print engine 14. In lieu of buffering halftone raster image 28, it can be fed directly from ASIC 18 to print engine 14 "on-the-fly".

It is to be understood that while the aforesaid procedures and data are maintained, for purposes of this explanation, in RAM 20, certain thereof could be included in a read-only memory which stores control firmware for printer 10.

Gray value pixel image 26 is of the known type wherein each pixel is represented by a multi-bit gray value. If gray value pixel image is a color image, it will comprise (generally) four color planes with three of the color planes representing cyan, magenta and yellow color values (or red, green and blue color planes). Each color value in each plane is represented by 8 bits. A fourth plane, representing black, will be comprised of single bit values at each pixel location where a black image value is to appear on the ultimate rendered output. Thus there are a total of 25 bits per pixel in gray value pixel image 26.

The object of halftone procedure 22 (along with dither matrix/tile control subprocedure 24) is to convert gray value pixel image 26 into halftoned raster image 28. However, due to memory limitations (e. g., two bits per pixel per color plane), laser print engine 14 is only able to render a limited number of different levels of modulation of the laser beam. Thus, while laser print engine 14 is capable of providing 8 levels of modulation of its output beam (for example), because each color pixel is only represented by two bits, (I. e., n=4), there are only three non-white pixel values which can be rendered onto a media sheet for each color (e. g. laser modulation values of ⅞, ⅖, ⅝ and ⅜, where the first digit represents the percentage of a modulation time of 8 that the laser is gated ON). The fourth pixel value is "white" (when the laser is modulated to an "off" state).

Figure 2:
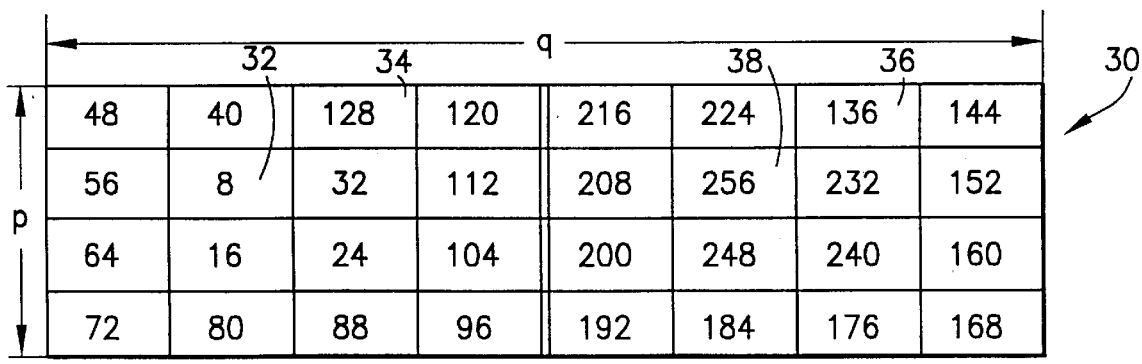
FIG. 2 is a schematic representation of a threshold dither matrix.

FIG. 2 illustrates a representative dither matrix 30 that comprises a p×q matrix of threshold values (e. g., 4×8). Each threshold value represents a level which must be exceeded by a positionally corresponding image pixel value for that image pixel value to be represented by a non-white halftone pixel in raster image 28. The arrangement of threshold values in dither matrix 30 is known. In the example shown, each threshold value differs from a next higher threshold value by a value of 8.

In brief, the lowest threshold value in dither matrix 30 resides in matrix position 32, with additional threshold values then spiraling in a generally outward direction until threshold matrix position 34 is reached. Thereafter the threshold values spiral inwardly, commencing at matrix position 36 and ending at matrix position 38.

As aforesaid, it can be seen that each matrix value differs from the next higher matrix value by 8 gray level values. If an underlying image pixel value exceeds the threshold value shown at a correspondingly located dither matrix position, that pixel will be printed with a level of laser modulation that is determined from the difference between the image gray level value and the threshold value.

Figure 3:
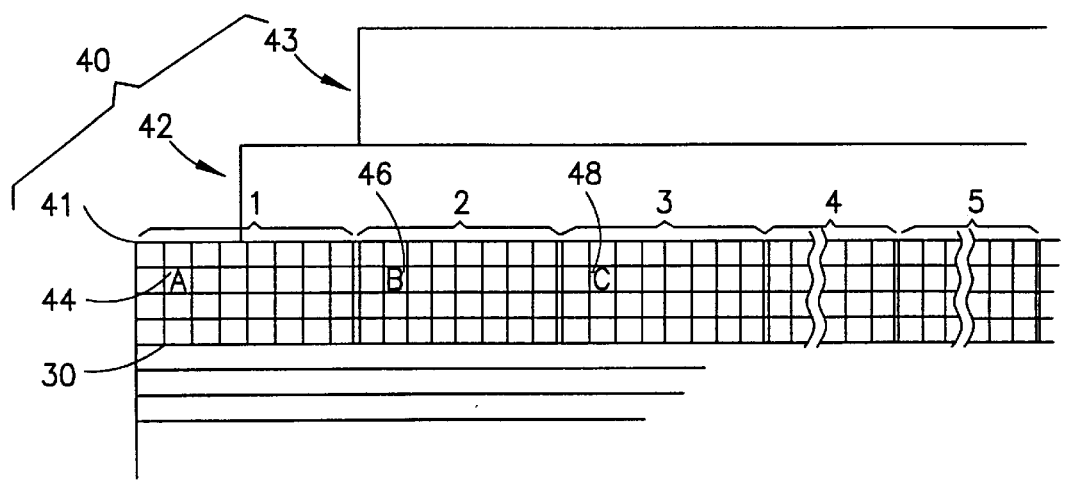
FIG. 3 is a schematic representation illustrating a logical tiling of the threshold dither matrix of FIG. 2 across an image of multi-level gray value pixels.

Prior to describing the detailed procedure of the invention, reference should be made to FIG. 3 wherein a pixel image 40 (received from a host processor) includes multiple pixels, each pixel represented, for instance, by corresponding pixel locations in three color planes 41, 42, 43, each an 8-bit color value. Threshold dither matrix 30 is tiled over the entirety of each color plane of image 40 by being logically stepped across a color plane in a sequential, raster manner, until all color planes have been tiled. At each tile position, threshold dither matrix is logically superimposed over a like size "pixel set". In FIG. 3, five successive tile positions superimposed over five contiguous pixel sets are shown on color plane 41, with tile positions 1, 3 and 5 being "odd" tile positions and tile positions 2, 4, etc. being "even" tile positions. (It should be noted that while one threshold dither matrix for all color planes is hereafter discussed, that a specially configured threshold dither matrix can be provided for each respective color plane).

As will be hereafter understood, laser modulation values assigned to image pixels, after being compared to a threshold value, differ in accordance with whether the pixel is located at an odd dither matrix tile position or an even dither matrix tile position. Thus, if gray values 44 and 48 (i.e., pixels A and C) differ from logically aligned dither matrix threshold values by a first difference value (i.e. a relational value) and pixel gray value 46 (pixel B) also differs from a logically aligned dither matrix value by the same difference value, different laser modulation level values are assigned to pixels A, B and C, respectively.

Figure 4:
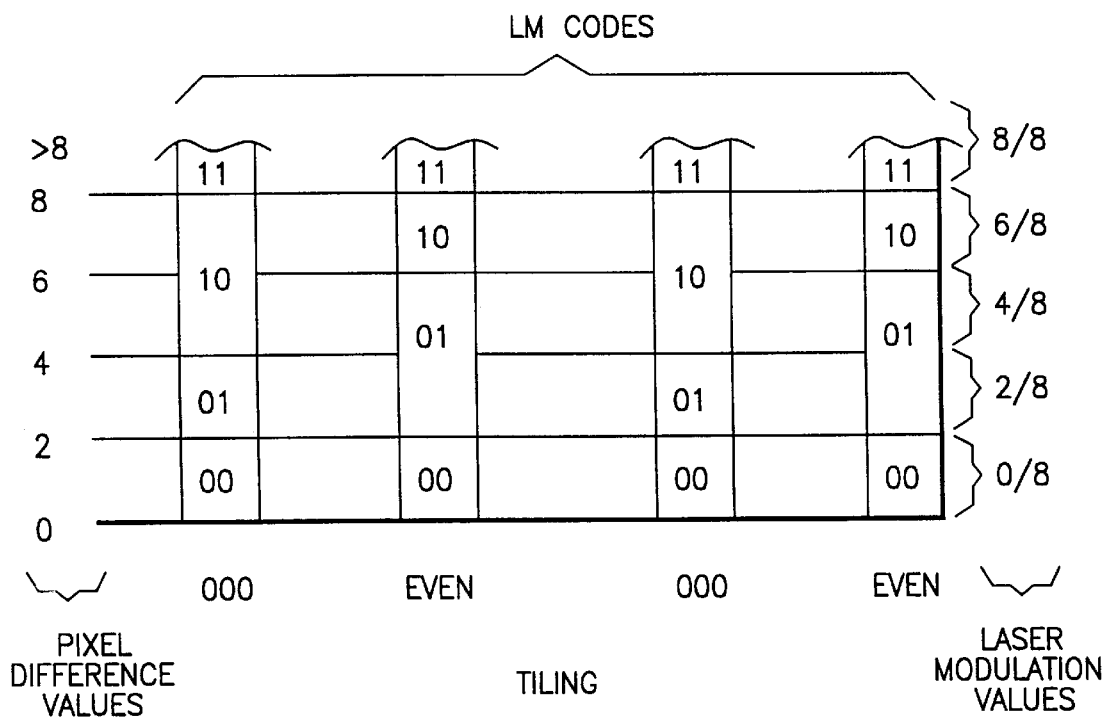
FIG. 4 is a schematic diagram illustrating assignment of adjusted laser modulation values in accordance with threshold dither matrix tile position—so as to achieve an apparent increase in gray levels.

Referring to FIGS. 2–4 in conjunction, the assignment of a 2-bit laser modulation (LM) code to each color plane image pixel will be described. Initially, assume that threshold matrix 30 is tiled over color plane 40 (FIG. 3). Further, assume that image pixel A exhibits a color value of 50 and that the logically aligned threshold value of dither matrix 30 is 8. The thresholding action subtracts 8 from color value of 50 and arrives at a difference of 42.

FIG. 4 schematically indicates the LM codes that are assigned to a color plane image pixel in dependence on (I) whether dither matrix 30 is at an odd or an even tile position and (ii) the difference between the logically aligned threshold value and the pixel gray (color) value. Note, that if the difference value is less than 2, a 00 LM code is assigned. Similarly, if the pixel difference value is equal or greater than 2, but less than 4, a 01 LM code is assigned. However, at an intermediate pixel difference value of 4, the assignment of the LM code changes in accordance with whether threshold dither matrix 30 is at an odd or an even tile position.

If threshold dither matrix 30 is at an odd tile position, and the pixel difference value is from 4 to 7, a 10 LM code is assigned. By contrast, if threshold dither matrix 30 is positioned at an even tile position, and the pixel difference value is 4 or 5, a 01 LM code is assigned and if the pixel difference value is 6 or 7, a 10 LM code is assigned. In all cases, if the pixel difference value equals or exceeds 8, a 11 LM code is assigned.

While, for purposes of explanation, the above halftoning action uses a pixel difference value (computed as the difference between the image gray level value and the dither matrix threshold value) whose magnitude determines the 2-bit LM code assigned to the pixel, it is to be understood that other halftoning methods can also be used to generate the LM code assignments. For example, a dither matrix with three thresholds per pixel can be employed, with each threshold value equal to the image gray level value at which an LM code transition should occur (i.e., 00 to 01, 01 to 10, 10 to 11). Such a dither matrix can encompass both the odd and even dither matrix tile positions previously discussed, with appropriately differing thresholds at the odd and even tile portions.

As above indicated, it is assumed that during each pixel time, the laser can be modulated in ⅛ pixel increments. Thus if a 00 LM code is assigned to a pixel, the laser is turned off. If, by contrast, a 01 LM code is assigned, a ⅖ LM value is output to the laser to activate it for ⅖ of a pixel time. If a 10 LM code is assigned, a ⅝ LM value is output to the laser to activate it for ⅝ of a pixel time. If a 11 LM code is assigned, a ⅝ LM value is output to the laser, activating it for the entire pixel time.

It can be seen that while only four LM codes and their corresponding LM values are used, five apparent gray values are available due to the assignment of a different LM code at odd and even dither matrix tile positions. It is the average of the gray values at the odd and even positions that accounts for the additional apparent gray value. However, the process introduces undesirable halftone variations between the odd and even tile positions.

Figure 5:
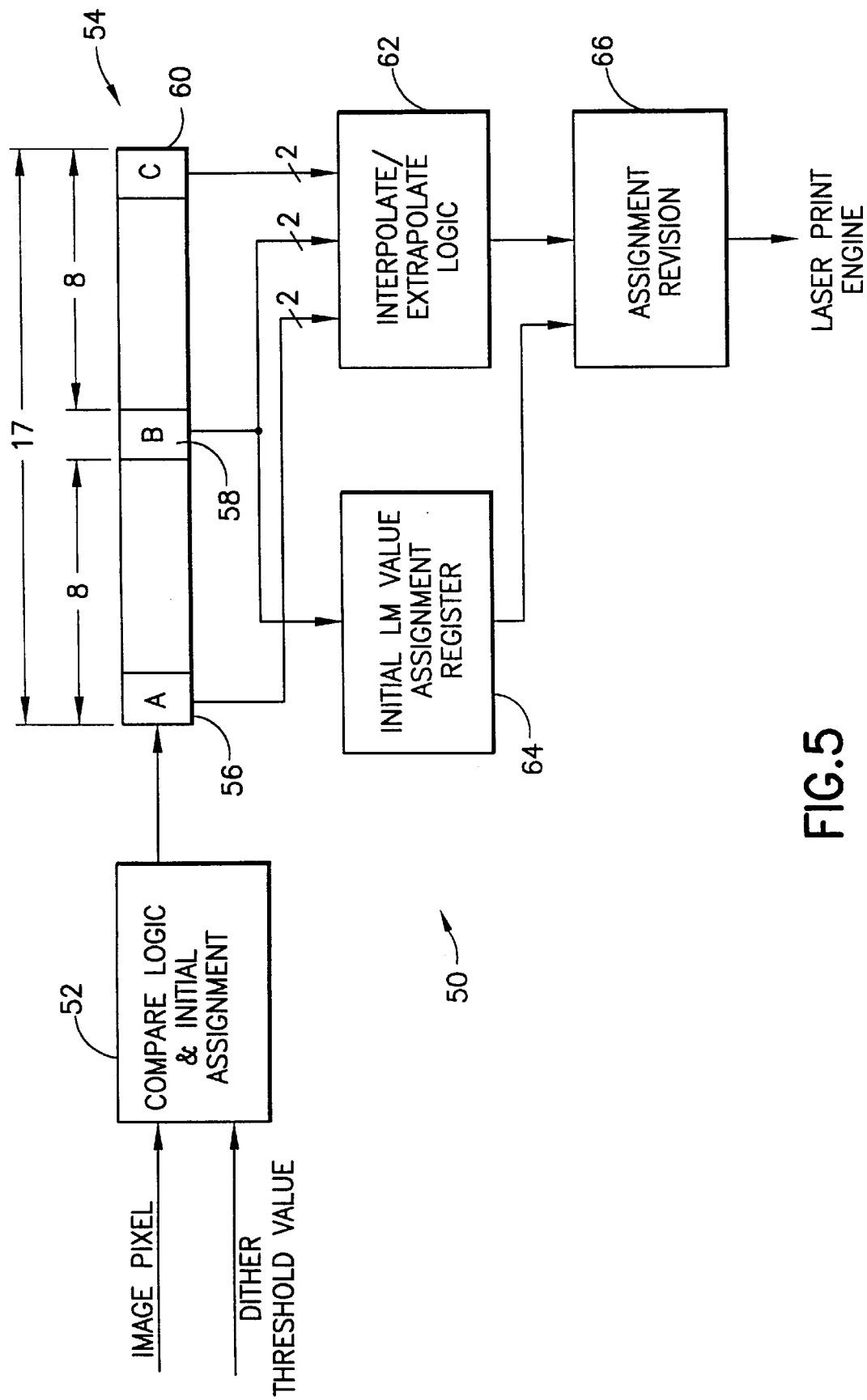
FIG. 5 is a block diagram of a smoothing circuit for adjusting laser modulation values to provide a smoothing of the perceived gray level transitions.

Turning now to FIG. 5, operation of a "smoothing" circuit 50 (contained within halftone ASIC 18 in FIG. 1) will be described which performs the assignment of initial LM values and then performs an interpolation/extrapolation smoothing action to assure a revision of the levels of laser modulation so as to remove the halftone variations and provide smoothed gray level images.

As described above, the halftone process causes each image pixel and a logically corresponding dither matrix value to be fed to a compare logic/initial assignment block 52. Within block 52, the dither matrix threshold value is subtracted from the image pixel gray (color) value and the result is compared to pixel difference value thresholds (see FIG. 4). Whichever pixel difference value threshold is exceeded by the difference value, results in the assignment of a corresponding LM code. The LM codes and associated initial LM values are assigned as shown in Table 1 below:

TABLE 1

00:0/8
01:2/8
10:6/8
11:8/8

Each of the 2-bit LM codes is inserted into a 2-bit multi-position register 54. If it is assumed that a 4×8 dither threshold matrix is used, such as shown in FIG. 2, then the length of register 54 is 17 bit positions, with bit positions 1, 9, and 17 holding LM codes assigned to image pixels A, B, C, (respectively separated by 8 pixel positions). Thus, register position 56 holds an LM code for image pixel A; register position 58 holds an LM code for image pixel B (offset from pixel A by 8 pixel positions); and register position 60 holds an LM code for image pixel C, (offset from the image pixel B by 8 pixel positions).

The physical positions of image pixels A, B, C can be understood by referring to FIG. 3 where it can be seen that they correspond to identical pixel positions in three succeeding tile locations of threshold matrix 30.

It can occur that the above-noted procedure may assign certain patterns of LM codes to pixels A, B and C which result in an undesired patterning of the gray levels in an ultimately rendered image. Accordingly, logic is performed by an interpolate-extrapolate logic block 62 which determines if the assignments of LM codes to pixels A, B and C results in LM values which will cause unwanted halftone variations and if so, an adjustment of the LM values is performed to enable a presentation of a smoothed gray level.

Initial LM value assignments are stored in a register 64 and are then passed to an assignment revision block 66, along with outputs from interpolate/extrapolate logic block 62. In assignment revision block 66, the initial LM value assigned to pixel B is revised in accordance with the LM codes assigned to pixels A, B and C. More specifically, a ⅖ or ⅝ LM value initially assigned to pixel B is potentially revised to a ⅘ LM value, in dependence upon the LM codes of pixels A, B and C.

Interpolate/extrapolate logic block 62 contains hardwired logic which implements the conditions shown in Table II below:

TABLE II

| Adjusted Level | Pixel A | Pixel B | Pixel C |
| --- | --- | --- | --- |
| 1) Level 4/8: | =01 | =10 | =00 or 01 |
| 2) Level 4/8: | =00 or 01 | =10 | =01 |
| 3) Level 4/8: | =10 | =01 | =11 or 10 |
| 4) Level 4/8: | =11 or 10 | =01 | =10 |

An examination of FIG. 4, in conjunction with line 1 in Table II, will indicate that if pixels A, B, and C evidence LM codes of 01; 10; and (00 or 01), respectively, it is assumed that even/odd/even tile positions have resulted in the aforesaid assignments. In such case, and to provide a smoother halftone presentation, pixel B (odd tile position) is reduced from the initial LM value of ⅝ to an LM value of ⅘. Since surrounding pixels A and C have pixel difference values that are less than a pixel difference threshold value of 6 (see left hand column of FIG. 4), it is assumed that the pixel difference value at pixel B is also less than 6 and, in effect, interpolates an upper bound for the LM value of pixel B. The 00 LM code possibility at pixel C (see Table II) acknowledges the fact that an image gray level change (i.e., an edge) can occur at the right boundary of a uniform gray area, and the upper bound is then extrapolated from the left (pixel A).

Line 2 of Table II is the reverse of the line 1 and results in the same LM value alteration within by assignment revision block 66. The 00 LM code possibility at pixel A acknowledges the fact that an image gray level change (i.e., an edge) can occur at the left boundary of a uniform gray area and the upper bound is then extrapolated from the right pixel (C).

If as shown in line 3 in Table II, pixels A, B and C have respectively assigned LM codes of: 10; 01 and 11 or 10, it is assumed that the sequence of image pixels is from odd/even/odd tile positions of dither matrix 30. Accordingly, the ⅖ LM value initially assigned to the 01 LM code at the even tile position is raised to a ⅘ LM value to provide a smoothed effect. Since surrounding pixels A and C have pixel difference values that equal or exceed a pixel difference value of 4 (see left hand column of FIG. 4), it is assumed that the pixel difference value at pixel B also equals or exceeds 4 and, in effect, interpolates a lower bound for the LM value of pixel B. The 11 LM code possibility at pixel C (see Table II) acknowledges the fact that an image gray level change (i.e., an edge) can occur at the right boundary of a uniform gray area, and the lower bound is then extrapolated from the left (pixel A).

Line 4 of Table II is the reverse of line 3 and results in the identical change in initially assigned LM level. The 11 LM code possibility at pixel A acknowledges the fact that an image gray level change (i.e., an edge) can occur at the left boundary of a uniform gray area and the lower bound is then extrapolated from the right pixel (C).

Having described the invention for the case of a 2 bit LM coding, it is apparent that the even/odd tile distribution of the pixel difference value threshold which separates the intermediate LM code levels 01 and 10, and subsequent smoothing, could also be applied to a greater number of LM code levels. If three bits are available for LM code storage, then the 5 pixel difference value thresholds separating the 001, 010, 011, 100, 101 and 110 levels can be even/odd tile distributed and subsequent smoothing applied to create five additional perceived smooth gray levels. In general, for an x-bit LM coding, $2^x-3$ additional perceived gray levels can be created.

Accordingly, not only does the invention provide for an image with added levels of perceived gray level halftone presentation, but also provides a smoothed effect over that which might otherwise result from a limited number of available halftone levels.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling a mark-producing laser apparatus to convert a gray level pixel image, wherein each pixel can manifest N possible gray levels, to a halftone image exhibiting n apparent non-white pixel gray values, where N>n, each pixel of said halftone image renderable by a laser at one of n−1 non-white gray levels, said method comprising the steps of:

a) sequentially, logically, tiling a dither matrix across an image color plane of gray pixel values of said gray level pixel image, including even tile positions and odd tile positions;

b) at each odd tile position and based upon a relational value between each image pixel and a logically superimposed dither matrix value, determining for each relational value, which of n−1 threshold values is exceeded, and if a relational value exceeds only one intermediate threshold value, assigning to the pixel for which the relational value was determined, a first laser modulation code;

c) at each even tile position and based upon said relational value between each image pixel and a logically superimposed dither matrix value,, determining for each relational value, which of n−1 threshold values is exceeded, and if a relational value exceeds only said one intermediate threshold value, assigning to the pixel for which the relational was determined, a second laser modulation code;

d) examining laser modulation codes assigned to at least first, second and third pixels that are correspondingly positioned at three sequentially tiled dither matrix positions and adjusting a laser modulation value assigned to said second pixel in accord with laser modulation codes assigned to said first and third pixels; and e) causing laser modulation values to be applied to control a laser print engine.

2. The method as recited in claim 1, wherein step d) adjusts the laser modulation value assigned to said second pixel to create a smoothed halftone presentation.

3. The method as recited in claim 2, wherein (I) n=4; (ii) the laser modulation codes are 00, 01, 10 and 11; (iii) step e) causes the laser print engine, for each pixel to be time-modulated so as to be turned on to one of t/T intervals, where t varies from 0 to T and T is a full-on value for an entire pixel print time and (iv) wherein the initial laser modulation values correspond as follows:

00:$t_0/T$
01:$t_1/T$
10:$t_2/T$
11:$t_3/T$.

4. The method as recited in claim 3, wherein if the laser modulation code of the second pixel is either 10 or 01, an initial laser modulation value of either $t_1/T$ or $t_2/T$ is assigned to the second pixel, and step d) adjusts the initial laser modulation value of the second pixel to a value between $t_1/T$ and $t_2/T$ in accord with the following table:

| First Pixel | Second Pixel | Third Pixel |
|---|---|---|
| =01 | =10 | =00 or 01 |
| =00 or 01 | =10 | =01 |
| =10 | =01 | =11 or 10 |
| =11 or 10 | =01 | =10. |

5. A laser apparatus for converting a gray level pixel image, wherein each pixel can manifest N possible gray levels, to a halftone image exhibiting n apparent non-white pixel gray values, where N>n, each pixel of said halftone image renderable at one of n−1 non-white gray levels, said laser apparatus comprising:

a) means for sequentially, logically, tiling a dither matrix across an image color plane of gray pixel values of said gray level pixel image, including even tile positions and odd tile positions;

b) means operative at each odd tile position, for determining, based upon a relational value between each image pixel and a logically superimposed dither matrix value, which of n−1 threshold values is exceeded, and if a relational value exceeds only one intermediate threshold value, assigning to the pixel for which the relational was calculated, a first laser modulation code;

c) means operative at each even tile position, for determining, based upon said relational value between each image pixel and a logically superimposed dither matrix value, which of n−1 threshold values is exceeded, and if a relational value exceeds only said one intermediate threshold value, assigning to the pixel for which the relational was calculated, a second laser modulation code;

d) means for examining laser modulation codes assigned to at least first, second and third pixels that are correspondingly positioned at three sequentially tiled dither matrix positions and adjusting a laser modulation value assigned to said second pixel in accord with laser modulation codes assigned to said first and third pixels; and e) means for causing laser modulation values to be applied to control a laser print engine.

6. The laser apparatus as recited in claim 5, wherein said means d) adjusts the laser modulation value assigned to said second pixel to create a smoothed halftone presentation.

7. The laser apparatus as recited in claim 6, wherein (I) n=4; (ii) the laser modulation codes are 00, 01, 10 and 11; (iii) means e) causes the laser print engine, for each pixel, to be time-modulated so as to be turned on to one of t/T intervals, where t varies from 0 to T and T is a full-on value for an entire pixel print time and (iv) wherein the initial laser modulation values correspond as follows:

00:$t_0$/T
01:$t_1$/T
10:$t_2$/T
11:$t_3$/T.

8. The laser apparatus as recited in claim 7, wherein if the laser modulation code of the second pixel is either 10 or 01, an initial laser modulation value of either $t_1$/T or $t_2$/T is assigned to the second pixel, and step d) adjusts the initial laser modulation value of the second pixel to a value between $t_1$/T and $t_2$/T in accord with the following table:

| First Pixel | Second Pixel | Third Pixel |
|---|---|---|
| =01 | =10 | =00 or 01 |
| =00 or 01 | =10 | =01 |
| =10 | =01 | =11 or 10 |
| =11 or 10 | =01 | =10. |

9. A method for enabling a mark-producing laser apparatus to convert a gray level pixel image, wherein each pixel can manifest N possible gray levels, to a halftone image exhibiting n apparent non-white pixel gray values, where N>n, each pixel of said halftone image renderable by a laser at one of n−1 non-white gray levels, said method comprising the steps of:

a) sequentially, logically, tiling a dither matrix across an image color plane of gray pixel values of said gray level pixel image, to encompass even pixel set positions and odd pixel set positions;

b) at each odd pixel set position, determining for each pixel thereof one of two relationships to one of n−1 threshold values, and assigning to each pixel that exhibits a first of said two relationships, a first initial laser modulation code;

c) at each even tile position, determining for each pixel thereof one of two relationships to one of n−1 threshold values, and assigning to each pixel that exhibits a second of said two relationships, a second initial laser modulation code;

d) examining laser modulation codes assigned to at least first, second and third pixels that are correspondingly positioned in three sequential pixel sets and adjusting a laser modulation value assigned to said second pixel in accord with laser modulation codes assigned to said first and third pixels; and e) causing said laser modulation values to be applied to control a laser print engine.

10. The method as recited in claim 9, wherein step d) adjusts the laser modulation value assigned to said second pixel to create a smoothed halftone presentation.

11. The method as recited in claim 10, wherein (I) n=4; (ii) the laser modulation codes are 00, 01, 10 and 11; (iii) step e) causes the laser print engine, for each pixel to be time-modulated so as to be turned on to one of t/T intervals, where t varies from 0 to T and T is a full-on value for an entire pixel print time and (iv) wherein the initial laser modulation values correspond as follows:

00:$t_0$/T
01:$t_1$/T
10:$t_2$/T
11:$t_3$/T.

12. The method as recited in claim 11, wherein if the laser modulation code of the second pixel is either 10 or 01, an initial laser modulation value of either $t_1$/T or $t_2$/T is assigned to the second pixel, and step d) adjusts the initial laser modulation value of the second pixel to a value between $t_1$/T and $t_2$/T in accord with the following table:

| First Pixel | Second Pixel | Third Pixel |
|---|---|---|
| =01 | =10 | =00 or 01 |
| =00 or 01 | =10 | =01 |
| =10 | =01 | =11 or 10 |
| =11 or 10 | =01 | =10. |

* * * * *